(12) United States Patent
Kobayashi et al.

(10) Patent No.: US 12,401,928 B2
(45) Date of Patent: Aug. 26, 2025

(54) PHOTOELECTRIC CONVERSION APPARATUS AND EQUIPMENT INCLUDING THE SAME

(71) Applicant: CANON KABUSHIKI KAISHA, Tokyo (JP)

(72) Inventors: Hideo Kobayashi, Tokyo (JP); So Hasegawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 132 days.

(21) Appl. No.: 18/523,017

(22) Filed: Nov. 29, 2023

(65) Prior Publication Data

US 2024/0179438 A1 May 30, 2024

(30) Foreign Application Priority Data

Nov. 30, 2022 (JP) ................. 2022-190920

(51) Int. Cl.
*H04N 25/78* (2023.01)
*H04N 25/46* (2023.01)
*H04N 25/79* (2023.01)

(52) U.S. Cl.
CPC ............. *H04N 25/78* (2023.01); *H04N 25/46* (2023.01); *H04N 25/79* (2023.01)

(58) Field of Classification Search
CPC ........ H04N 25/78; H04N 25/46; H04N 25/79; H04N 25/75
See application file for complete search history.

(56) References Cited

U.S. PATENT DOCUMENTS

| | | | | |
|---|---|---|---|---|
| 8,786,746 B2* | 7/2014 | Nitta | ...................... | H04N 25/46 348/321 |
| 9,769,404 B2* | 9/2017 | Ohshitanai | ........... | H04N 25/633 |
| 2009/0128678 A1* | 5/2009 | Kitami | ................... | H04N 25/78 348/308 |
| 2015/0326806 A1* | 11/2015 | Moriwaka | .............. | H04N 25/53 348/302 |

FOREIGN PATENT DOCUMENTS

| | | |
|---|---|---|
| JP | 2009124550 A | 6/2009 |
| JP | 2021197648 A | 12/2021 |
| WO | 2014103730 A1 | 7/2014 |

\* cited by examiner

*Primary Examiner* — Nhan T Tran
(74) *Attorney, Agent, or Firm* — Canon U.S.A., Inc. IP Division

(57) ABSTRACT

A photoelectric conversion apparatus includes a first pixel, a second pixel, a first output line electrically connectable to the first pixel, a second output line electrically connectable to the second pixel, a first comparator electrically connectable to the first output line, and a second comparator electrically connectable to the second output line, wherein the first output line is electrically connectable to the second comparator via a first wiring line, the second output line is electrically connectable to the first comparator via a second wiring line, and the first wiring line and the second wiring line are electrically isolated from each other.

21 Claims, 17 Drawing Sheets

PHOTOELECTRIC CONVERSION APPARATUS AND EQUIPMENT INCLUDING THE SAME

BACKGROUND

Technical Field

The aspect of the embodiments relates to photoelectric conversion apparatuses and equipment including the same.

Description of the Related Art

A known photoelectric conversion apparatus includes pixels that generate pixel signals by photoelectric conversion and output lines through which the pixel signals are output. International Publication No. WO2014-103730 discloses a solid-state image sensor having the function of adding up pixel signals among output lines that are electrically connected to different pixels.

In a configuration in which some of multiple output lines are connectable to a comparator to which the other output lines are connectable, like International Publication No. WO2014-103730, some of ways of reading are unavailable in the addition of pixel signals.

SUMMARY

The disclosure provides a photoelectric conversion apparatus that achieves a wide variety of reading using a plurality of comparators in adding pixel signals together.

In an aspect of the embodiments, a photoelectric conversion apparatus includes a first pixel, a second pixel, a first output line electrically connectable to the first pixel, a second output line electrically connectable to the second pixel, a first comparator electrically connectable to the first output line, and a second comparator electrically connectable to the second output line, wherein the first output line is electrically connectable to the second comparator via a first wiring line, the second output line is electrically connectable to the first comparator via a second wiring line, and the first wiring line and the second wiring line are electrically isolated from each other.

Further features of the disclosure will become apparent from the following description of exemplary embodiments with reference to the attached drawings.

DESCRIPTION OF THE EMBODIMENTS

Figure 1:
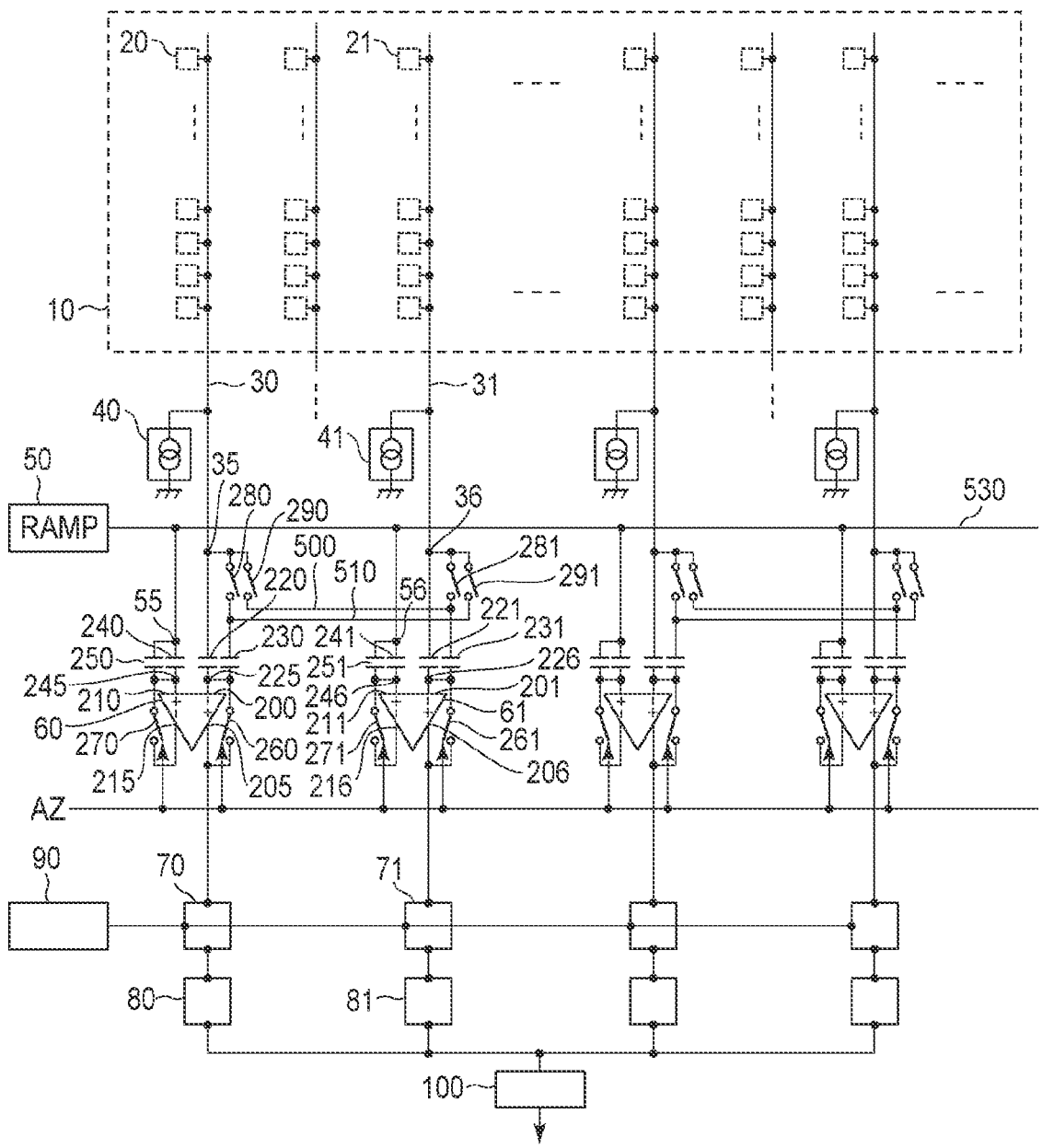
FIG. 1 is a circuit diagram illustrating a photoelectric conversion apparatus according to a first embodiment.

Embodiments will be described with reference to the drawings. The following embodiments are not intended to limit the disclosure according to the claims. The embodiments describe a plurality of features, but not all of the features are required for the disclosure. The features may be freely combined. In the attached drawings, the same or similar components are given the same reference signs, and duplicated descriptions will be omitted. The embodiments describe sensors for image capturing as examples of the photoelectric conversion apparatus. The embodiments are applicable not only to the sensors for image capturing but also to other examples of the photoelectric conversion apparatus. Examples include image capturing apparatuses, distance measuring apparatuses (apparatuses for measuring distance using focus detection or Time Of Flight (TOF)) and photometric apparatuses (apparatuses for measuring incident light amount).

In this specification, terms indicating specific directions or locations (for example, "top" "bottom", "right", "left", and other terms containing these terms) are used as needed. It is to be understood that these terms are used to facilitate understanding the embodiments with reference to the drawings and that the technical scope of the disclosure is not limited by the meaning of these terms.

In this specification, "electrically connecting component A and component B" is not limited to "directly connecting component A and component B". For example, component A and component B only have to be electrically connected even with another component C therebetween.

In this specification, "flat surface" refers to a surface parallel to the principal surface of the substrate. The principal surface of the substrate may be a light incident surface of the substrate including a photoelectric conversion element, a surface on which a plurality of analog-to-digital converters (ADCs) are repeatedly arranged, or the joining surface between the substrates of a laminated photoelectric conversion apparatus. The term "plan view" refers to a view from the direction perpendicular to the principal surface of the substrate. The term "cross section" refers to a surface perpendicular to the light incident surface of a semiconductor layer. The term "cross-sectional view" refers to a view from the direction parallel to the principal surface of the substrate.

The metallic components, such as wiring lines and pads, described in this specification may be either a single element metal or a mixture (alloy). For example, a wiring line described as a copper wiring line may be made of elemental copper or may principally contain copper and additionally contain another component. For example, a pad connected to an external terminal may be made of elemental aluminum or may principally contain aluminum and additionally contain another component. The copper wiring line and the aluminum pad here are illustrative only, and a variety of metals are applicable. The wiring line and the pad are mere examples of metallic components used in photoelectric conversion apparatuses, and other metallic components are applicable.

In the following description, the electric charges accumulated by the photoelectric conversion units in the pixels are electrons. All of the transistors of the pixels are N-channel metal-oxide-semiconductor (MOS) transistors (hereinafter abbreviated to NMOS transistors). Alternatively, the electric charges accumulated by the photoelectric conversion unit may be holes. In this case, the transistors of the pixels may be P-channel MOS transistors (hereinafter abbreviated to PMOS transistors). In other words, the conductivity type of the transistors and so on can be changed as appropriate depending on the polarity of the electric charges treated as signals.

First Embodiment

A photoelectric conversion apparatus according to a first embodiment of the disclosure will be described with reference to FIGS. 1 to 4.

FIG. 1 illustrates an example of the circuit diagram of the photoelectric conversion apparatus according to this embodiment.

As illustrated in FIG. 1, the photoelectric conversion apparatus includes a pixel array section 10. The pixel array section 10 includes pixels in multiple rows and multiple columns. The pixels generate pixel signals by photoelectric conversion. The pixel array section 10 includes output lines corresponding to the individual pixel columns.

In this embodiment, first pixels 20 are arranged in any column. Second pixels 21 are arranged in any columns different from any columns of the first pixels 20. The circuit configurations of the first pixels 20 and the second pixels 21 are the same. A first output line 30 can be electrically connected to the first pixels 20, and the first pixels 20 output pixel signals to the first output line 30. A second output line 31 is electrically connectable to the second pixels 21, and the second pixels 21 output pixel signals to the second output line 31.

The column in which the first pixels 20 are arranged and the column in which the second pixels 21 are arranged may be either continuous or not continuous. The pixels in the pixel array section 10 may be each provided with a red, green, or blue color filter. This configuration allows for providing color information. These color filters typically have a Bayer pattern. Using color filters of the same color for the first pixels 20 and the second pixels 21 allows addition of the pixel signals of the first pixels 20 and the second pixels 21 to be performed as addition of pixel signals of the same color. In contrast, using color filters of different colors for the first pixels 20 and the second pixels 21 also allows addition of pixel signals, although decreasing the accuracy of color information. Each of the pixels of the pixel array section 10 does not have to include a color filter. Although FIG. 1 illustrates a configuration in which one output line is provided for each pixel column, this is illustrative only. For example, two or more output lines may be provided for each pixel column.

The photoelectric conversion apparatus includes a first current source 40, a ramp-signal generation circuit 50, a first comparator 60, a first memory 70, a second memory 80, a counter 90, and a processing circuit 100. The first current source 40, the first comparator 60, the first memory 70, and the second memory 80 are provided for the first output line 30 and are electrically connectable to the first output line 30. The first current source 40 supplies voltage and current to the first output line 30. The ramp-signal generation circuit 50 generates a ramp signal RAMP, which changes in voltage with time, and supplies the ramp signal RAMP to the first comparator 60. The first comparator 60 outputs a comparation result signal indicating the result of comparation between the pixel signal output from the first output line 30 and the ramp signal RAMP to the first memory 70. The counter 90 generates a count signal indicating the passage of time and outputs the count signal to the first memory 70. The first memory 70 stores the count signal output from the counter 90 based on a change in the signal level of the comparation result signal output from the first comparator 60. Thus, the count signal of a signal value corresponding to the value of the pixel signal is stored in the first memory 70 as a digital signal corresponding to the pixel signal, and thus the pixel signal output from the first pixel 20 is converted from analog to digital. The digital signal stored in the first memory 70 is transferred to the second memory 80. The processing circuit 100 reads the digital signal from the second memory 80 disposed in correspondence with the first pixel 20. The processing circuit 100 performs various kinds of digital signal processing, such as amplification, noise reduction, addition, and correction, on the read digital signal. The processing circuit 100 outputs the digital signal outside of the photoelectric conversion apparatus.

The photoelectric conversion apparatus further includes a second current source 41, a second comparator 61, a third memory 71, and a fourth memory 81. The second current source 41, the second comparator 61, the third memory 71, the fourth memory 81 are provided for the second output line 31 and are electrically connectable to the second output line 31. The second current source 41 supplies voltage and current to the second output line 31. The ramp-signal generation circuit 50 generates a ramp signal RAMP, which changes in voltage with time, and supplies the ramp signal RAMP to the second comparator 61. The second comparator 61 outputs a comparation result signal indicating the result of comparation between the pixel signal output from the second output line 31 and the ramp signal RAMP to the third memory 71. The counter 90 generates a count signal indicating the passage of time and outputs the count signal to the third memory 71. The third memory 71 stores the count signal output from the counter 90 based on a change in the signal level of the comparation result signal output from the second comparator 61. Thus, the count signal of a signal value corresponding to the value of the pixel signal is stored in the third memory 71 as a digital signal corresponding to the pixel signal, and thus the pixel signal output from the second pixel 21 is converted from analog to digital. The digital signal stored in the third memory 71 is transferred to the fourth memory 81. The processing circuit 100 reads the digital signal from the fourth memory 81 disposed in correspondence with the second pixel 21. The processing circuit 100 performs various kinds of digital signal processing, such as amplification, noise reduction, addition, and correction, on the read digital signal. The processing circuit 100 outputs the digital signal outside of the photoelectric conversion apparatus.

The first comparator 60 includes a first input terminal 200, a second input terminal 210, a first output terminal 205, a second output terminal 215, a first feedback switch 260, and a second feedback switch 270. FIG. 1 illustrates an example in which the first input terminal 200 is an inverting input terminal, the second input terminal 210 is a non-inverting input terminal, the first output terminal 205 is a non-inverted output terminal, and the second output terminal 215 is an inverted output terminal. Alternatively, the first input terminal 200 may be a non-inverting input terminal, the second input terminal 210 may be an inverting input terminal, the first output terminal 205 may be an inverted output terminal, and the second output terminal 215 may be a non-inverted output terminal.

The second comparator 61 includes a third input terminal 201, a fourth input terminal 211, a third output terminal 206, a fourth output terminal 216, a third feedback switch 261, and a fourth feedback switch 271. FIG. 1 illustrates an example in which the third input terminal 201 is an inverting input terminal, the fourth input terminal 211 is a non-inverting input terminal, the third output terminal 206 is a non-inverted output terminal, and the fourth output terminal 216 is an inverted output terminal. Alternatively, the third input terminal 201 may be a non-inverting input terminal, the fourth input terminal 211 may be an inverting input terminal, the third output terminal 206 may be an inverted output terminal, and the fourth output terminal 216 may be a non-inverted output terminal.

The first feedback switch 260 is electrically connected to the first input terminal 200 at one end and to the first output terminal 205 at the other end. The second feedback switch 270 is electrically connected to the second input terminal 210 at one end and to the second output terminal 215 at the other end. The third feedback switch 261 is electrically connected to the third input terminal 201 at one end and to the third output terminal 206 at the other end. The fourth feedback switch 271 is electrically connected to the fourth input terminal 211 at one end and to the fourth output terminal 216 at the other end. The first feedback switch 260, the second feedback switch 270, the third feedback switch 261, and the fourth feedback switch 271 are switched between an on-state and an off-state in response to a control signal AZ. The first feedback switch 260, the second feedback switch 270, the third feedback switch 261, and the fourth feedback switch 271 may be omitted.

The first comparator 60 further includes a first input capacitive element 220 and a second input capacitive element 230. The second comparator 61 further includes a third input capacitive element 221 and a fourth input capacitive element 231. The first comparator 60 further includes a fifth input capacitive element 240 and a sixth input capacitive element 250. The second comparator 61 further includes a seventh input capacitive element 241 and an eighth input capacitive element 251. A pixel signal output from at least one of the first pixels 20 and the second pixels 21 is input to the first input terminal 200. A first ramp signal RAMP1 is input to the second input terminal 210 via at least one of the fifth input capacitive element 240 and the sixth input capacitive element 250. A pixel signal output from at least one of the first pixels 20 and the second pixels 21 is input to the third input terminal 201. A second ramp signal RAMP2 is input to the fourth input terminal 211 via at least one of the seventh input capacitive element 241 and the eighth input capacitive element 251. In this embodiment, the first ramp signal RAMP1 and the second ramp signal RAMP2 are substantially equal and correspond to the ramp signal RAMP. The relationship "substantially equal" here will be described. Although the relationship is equal in design, a slight difference may be caused by a manufacturing error. The "substantially equal" includes the slight difference caused by the manufacturing error.

The photoelectric conversion apparatus further includes a first wiring line 500, a second wiring line 510, a first ramp signal wiring line 530, a first switch 280, a second switch 281, a third switch 290, and a fourth switch 291. The first wiring line 500 and the second wiring line 510 are disposed between the first output line 30 and the second output line 31. The first output line 30 is electrically connectable to the second comparator 61 via the first wiring line 500. The second output line 31 is electrically connectable to the first comparator 60 via the second wiring line 510. The first wiring line 500 and the second wiring line 510 are electrically isolated from each other. The ramp-signal generation circuit 50 supplies the ramp signal RAMP to the first comparator 60 and the second comparator 61 via the first ramp signal wiring line 530.

The first switch 280, the second switch 281, the third switch 290, and the fourth switch 291 are disposed between the first output line 30 and the second output line 31. The first switch 280 is electrically connected between the first pixels 20 and the second input capacitive element 230. The second switch 281 is electrically connected between the second pixels 21 and the fourth input capacitive element 231. The third switch 290 is electrically connected between the first pixels 20 and the fourth input capacitive element 231. The fourth switch 291 is electrically connected between the second pixels 21 and the second input capacitive element 230. The first switch 280 is disposed in correspondence with the first output line 30. The second switch 281 is disposed in correspondence with the second output line 31. The third switch 290 is disposed for the first wiring line 500. The fourth switch 291 is disposed for the second wiring line 510.

The first input capacitive element 220 has a first connection node 35 and a second connection node 225 at the opposite ends. The fifth input capacitive element 240 has a third connection node 55 and a fourth connection node 245 at the opposite ends. The third input capacitive element 221 has a fifth connection node 36 and a sixth connection node 226 at the opposite ends. The seventh input capacitive element 241 has a seventh connection node 56 and an eighth connection node 246 at the opposite ends. The first connection node 35 is electrically connected between the first input capacitive element 220 and the first pixels 20. The second connection node 225 is electrically connected between the first input capacitive element 220 and the first input terminal 200. The third connection node 55 is electrically connected between the fifth input capacitive element 240 and the first ramp signal wiring line 530. The fourth connection node 245 is electrically connected between the fifth input capacitive element 240 and the second input terminal 210. The fifth connection node 36 is electrically connected between the third input capacitive element 221 and the second pixels 21. The sixth connection node 226 is electrically connected between the third input capacitive element 221 and the third input terminal 201. The seventh connection node 56 is electrically connected between the seventh input capacitive element 241 and the first ramp signal wiring line 530. The eighth connection node 246 is electrically connected between the seventh input capacitive element 241 and the fourth input terminal 211.

The current source, the comparator, and the two memories each disposed in correspondence with the first output line 30 and the second output line 31 may be disposed for output lines disposed in columns different from those of the first output line 30 and the second output line 31. The wiring lines and the switches disposed between the first output line 30 and the second output line may be disposed between output lines disposed in columns different from those of the first output line 30 and the second output line 31. In this specification, the description of the first pixels 20 is applicable to the second pixels 21 and the other pixels. The description about the first output line 30 is also applicable to the second output line 31 and the other output lines. The description about the interval between the first output line 30 and the second output line 31 is also applicable to the interval between the output lines in columns different from those of the first output line 30 and the second output line 31.

Although FIG. 1 illustrates an example in which the counter 90 is used in common for the output lines in the columns, multiple counters may be provided for the output lines in the individual columns. Although FIG. 1 illustrates an example in which the ramp-signal generation circuit 50 is used in common for the output lines in the individual columns, multiple ramp-signal generation circuits may be provided for the output lines in the individual columns.

Figure 2:
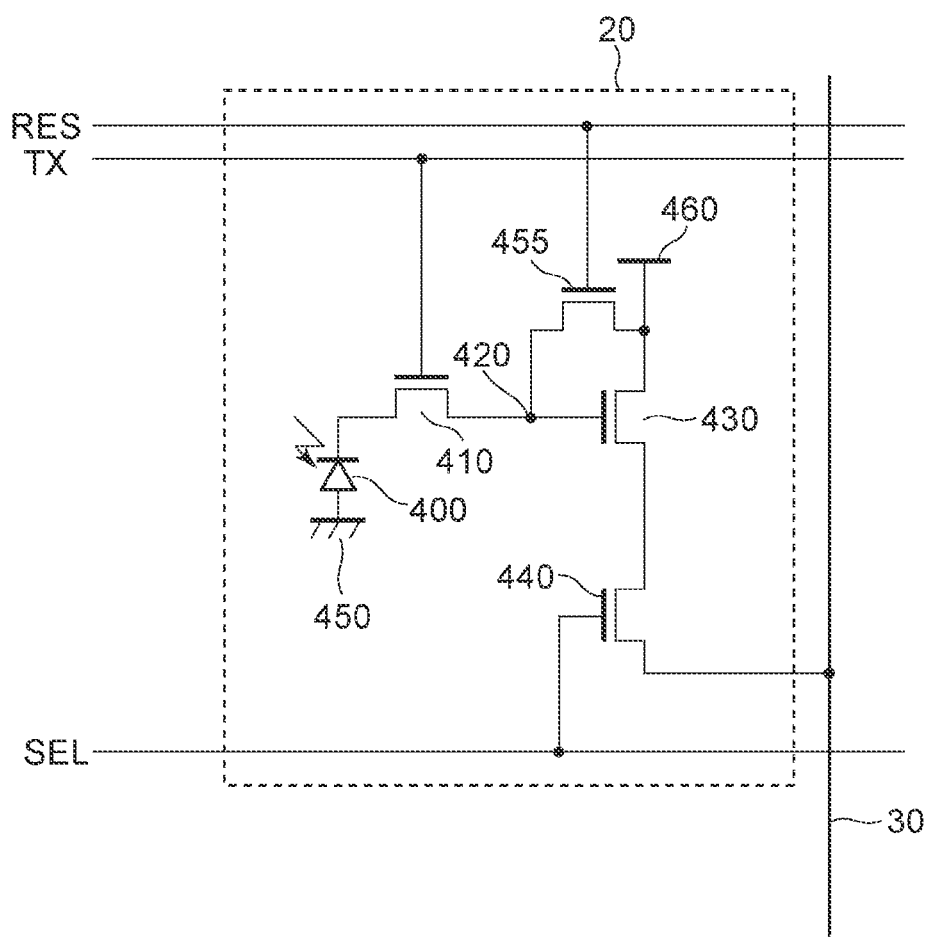
FIG. 2 is a circuit diagram illustrating the photoelectric conversion apparatus according to the first embodiment.

FIG. 2 illustrates an example circuit diagram of the first pixel 20 of this embodiment.

As illustrated in FIG. 2, the first pixel 20 includes a photoelectric conversion unit 400, a transfer transistor 410, and a floating diffusion section 420. In this specification, the floating diffusion section 420 may be referred to as an FD section 420. The first pixel 20 further includes a reset transistor 455 for resetting the FD section 420, an amplifier transistor 430 for amplifying signals, and a selection transistor 440. The photoelectric conversion unit 400 is electrically connected to a ground voltage node 450. The reset transistor 455 and the amplifier transistor 430 are electrically connected to a power-supply voltage node 460 and is supplied with a power supply voltage. The selection transistor 440 may be omitted. The transfer transistor 410, the reset transistor 455, the amplifier transistor 430, and the selection transistor 440 may be either N-type transistors or P-type transistors.

One example of the photoelectric conversion unit 400 is a photodiode. The photoelectric conversion unit 400 receives light incident on the first pixel 20 and generates a signal charge corresponding to the incident light. The reset transistor 455 is driven in response to a control signal RES. The FD section 420 is reset to a voltage based on the power supply voltage by the activation of the reset transistor 455. The reset of the FD section 420 is released by the deactivation of the reset transistor 455. The transfer transistor 410 is driven in response to a control signal TX. The signal charge generated by the photoelectric conversion unit 400 is transferred to the FD section 420 by the activation of the transfer transistor 410.

The FD section 420 functions as an electric-charge-voltage converting section that temporarily stores the signal charge input from the photoelectric conversion unit 400 and converts the stored signal charge to a voltage signal. The amplifier transistor 430 amplifies the pixel signal converted by the FD section 420. The selection transistor 440 is driven by a control signal SEL to electrically connect the amplifier transistor 430 to the first output line 30, thereby outputting the pixel signal amplified by the amplifier transistor 430 to the first output line 30. Thus, the first output line 30 outputs a pixel signal corresponding to the voltage of the FD section 420.

The configuration of the first pixel 20 is not limited to the configuration in FIG. 2. The capacitance of the FD section 420 may be changeable. The first pixel 20 may be configured to share the FD section 420 with a plurality of photoelectric conversion units. The first pixel 20 may be configured to have a plurality of photoelectric conversion units below the same microlens so as to detect the phase difference.

Figure 3:
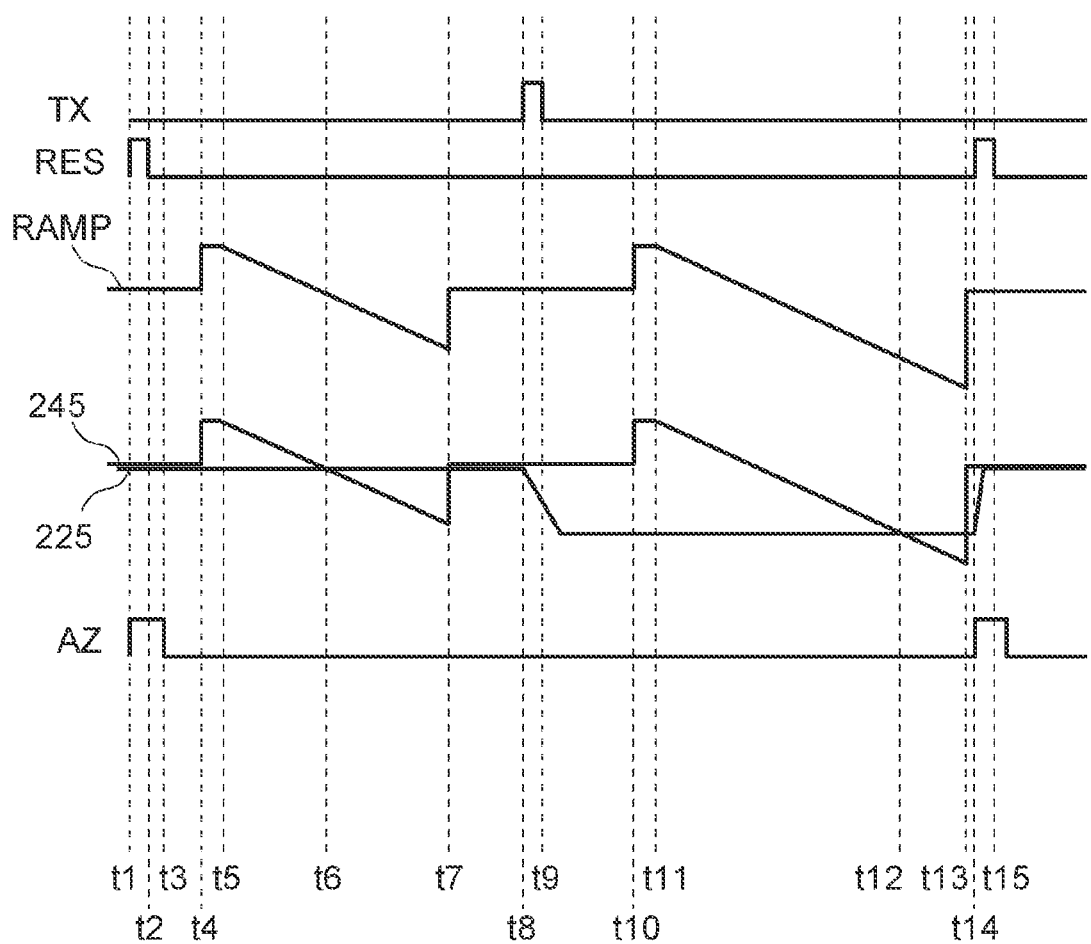
FIG. 3 is a timing chart showing the driving of the photoelectric conversion apparatus according to the first embodiment.

FIG. 3 is an example timing chart showing the driving of the photoelectric conversion apparatus according to this embodiment. Driving with and without performing addition of pixel signals between output lines in different columns will be described with reference to FIG. 3.

FIG. 3 shows time on the horizontal axis and voltage on the vertical axis. The control signals shown in FIG. 3 individually correspond to the control signals shown in FIGS. 1 and 2. The reset-level signal of the first pixel 20 is converted from analog to digital during the period from time t5 to time t7. The photoelectric conversion signal of the first pixel 20 is converted from analog to digital during the period from time t11 to time t13.

The reset-level signal and the photoelectric conversion signal output from the first pixel 20 will be described.

The FD section 420 is reset to a voltage based on the power supply voltage by the activation of the reset transistor 455. The reset of the FD section 420 is released by the deactivation of the reset transistor 455. The reset-level signal output from the first pixel 20 is the signal output from the amplifier transistor 430 in response to the voltage of the FD section 420 after the reset is released. This reset-level signal contains the noise component of the first pixel 20.

Thereafter, the signal charge generated by the photoelectric conversion of the incident light by the photoelectric conversion unit 400 by the activation of the transfer transistor 410 is transferred to the FD section 420. The amplifier transistor 430 outputs, as a photoelectric conversion signal, a signal corresponding to the voltage of the FD section 420 to which the signal charge is transferred. The pixel signal output from the first pixel 20 includes the reset-level signal and the photoelectric conversion signal.

First, the driving without performing the addition of the pixel signals between output lines disposed in different columns will be described. In this case, the first switch 280 and the second switch 281 are turned on, and the third switch 290 and the fourth switch 291 are turned off (first mode). In other words, the second input capacitive element 230 is electrically connected to the first output line 30, and the fourth input capacitive element 231 is electrically connected to the second output line 31. Thus, the pixel signal output from the first pixel 20 is input to the first input terminal 200 via at least one of the first input capacitive element 220 and the second input capacitive element 230. The pixel signal output from the second pixel 21 is input to the third input terminal 201 via at least one of the third input capacitive element 221 and the fourth input capacitive element 231.

At time t1, the control signal RES is set to a high level. This causes the reset transistor 455 to be turned on, so that the FD section 420 is reset. The voltage of the first output line 30 goes to a reset level correspondingly. Setting the control signal AZ to a high level at time t1 causes the first feedback switch 260 and the second feedback switch 270 to come to an on-state.

Bringing the control signal RES to a low level at time t2 causes the reset transistor 455 to be turned off. At time t2, the first connection node 35 goes to a reset level for the first output line 30, and the second connection node 225 goes to a reset level for the first comparator 60. The third connection node 55 goes to a reference level of the ramp signal RAMP, and the fourth connection node 245 goes to a reset level for the first comparator 60. Bringing the control signal AZ to a low level at time t3 causes the first feedback switch 260 and the second feedback switch 270 to be turned off. Thus, the first feedback switch 260 and the second feedback switch 270 are turned on, with the first input terminal 200 supplied with the reset-level signal and the second input terminal 210 supplied with the reference level of the ramp signal RAMP, and are then turned off. This allows the first input capacitive element 220 and the third input capacitive element 221 to have the same potential difference. The allows the input offset voltage of the first comparator 60 to be cancelled.

At time t4, the ramp signal RAMP supplied to the first comparator 60 changes to a start voltage. Thereafter, during the period from time t5 to t7, the ramp signal RAMP changes in voltage with time. At time t6, the output of the first comparator 60 is changed by a change in the voltage magnitude relationship between the second connection node 225 and the fourth connection node 245. The time taken for this change is measured by the counter 90 and stored in first memory 70 to convert the reset-level signal from analog to digital. The result of the A/D conversion is sent from the first memory 70 to the second memory 80 and then to the processing circuit 100. At time t7, the ramp signal RAMP is reset.

At time t8, the control signal TX is set to a high level. This causes the transfer transistor 410 to be turned on, so that the signal charge is transferred from the photoelectric conversion unit 400 to the FD section 420. The voltage of the FD section 420 decreases depending on the amount of the transferred signal charge. The decrease in the voltage of the FD section 420 causes the voltage of the first output line 30 to be decreased, and the voltage of the second connection node 225 also to be decreased correspondingly. At time t9, the control signal TX is brought to a low level, so that the transfer transistor 410 is turned off.

During the period from time t11 to t13, the ramp signal RAMP supplied to the first comparator 60 changes in voltage again with time. At time t12, the output of the first comparator 60 is changed again by a change in the voltage magnitude relationship between the second connection node 225 and the fourth connection node 245. The time taken for this change is measured by the counter 90 and stored in the first memory 70 to convert the photoelectric conversion signal from analog to digital. The result of the A/D conversion is sent from the first memory 70 to the second memory 80 and then to the processing circuit 100. Finally, the output from the first pixels 20 is obtained through a correlated double sampling (CDS) operation, which involves performing differential processing between the A/D conversion results of the photoelectric conversion signal and the A/D conversion result of the reset-level signal.

At time t13, the ramp signal RAMP is reset again. At time t14, the control signal RES is brought to a high level. This causes the reset transistor 455 to be turned on, so that the FD section 420 is reset. Thus, the voltage of the first output line 30 returns to the reset level.

The above driving of the first pixels 20 also applies to the second pixels 21.

Next, driving involving addition of pixel signals between output lines provided in different columns will be described. In this case, the first switch 280 and the second switch 281 are turned off, and the third switch 290 and the fourth switch 291 are turned on (second mode). In other words, the second input capacitive element 230 is electrically connected to the second output line 31, and the fourth input capacitive element 231 is electrically connected to the first output line 30. Accordingly, the pixel signals output from the first pixels 20 are input to the first input terminal 200 via the first input capacitive element 220. The pixel signals output from the second pixels 21 are input to the first input terminal 200 via the second input capacitive element 230. The pixel signals output from the second pixels 21 are input to the third input terminal 201 via the third input capacitive element 221. The pixel signals output from the first pixels 20 are input to the third input terminal 201 via the fourth input capacitive element 231.

In this case, the amount of voltage drop of the second connection node 225 at time t8 in FIG. 3 depends on, not the amount of voltage drop of the first output line 30, the average value of the amounts of voltage drop of the first output line 30 and the second output line 31. In other words, the pixel signal voltages output from the first output line 30 and the second output line 31 are added and averaged at the reading of the signal level of the photoelectric conversion signal. The amount of voltage drop of the sixth connection node 226 also depends on, not the amount of voltage drop of the second output line 31, the average value of the amounts of voltage drop of the first output line 30 and the second output line 31. Thus, both of the first memory 70 and the third memory 71 store the A/D conversion results based on the average value of the pixel signal voltages of the first output line 30 and the second output line 31. Averaging the two A/D conversion results with the processing circuit 100 allows random noise caused by the first comparator 60 and the second comparator 61 to be reduced.

Giving a higher priority to power consumption reduction than to random noise reduction allows reduction in electric power by bringing the second comparator 61 to a power-off state. The power-off state includes not only a state in which the power consumption of the second comparator 61 is zero but also a state in which the power consumption is lower than that in normal operation (standby state).

Thus, this embodiment is configured to connect the first output line 30 to the fourth input capacitive element 231, and the second output line 31 to the second input capacitive element 230. This configuration allows, at the addition of the pixel signals between columns, reading using a single comparator and reading using a plurality of comparators. In other words, this configuration provides a variety of ways of reading at the addition of the pixel signals between columns.

In FIG. 1, the sum of the capacitance values of the first input capacitive element 220 and the second input capacitive element 230 is substantially equal to the sum of the capacitance values of the fifth input capacitive element 240 and the sixth input capacitive element 250. This allows reducing or minimizing image degradation due to fluctuations in power supply voltage by equalizing the influence of, for example, a change in power supply voltage, between the second connection node 225 and the fourth connection node 245. Furthermore, for example, when the power-supply voltage node 460 and the ground voltage node 450 have a given parasitic capacitance for the second connection node 225 and the fourth connection node 245, the voltages of the second connection node 225 and the fourth connection node 245 can vary due to fluctuations in the power supply voltage and the ground voltage. In this case, the substantially equal sum of the capacitance values of the input capacitive elements makes the voltage fluctuations of both connection nodes tend to be equal, making it easier to achieve image degradation reduction effects by removing common-phase noise at the first comparator 60.

Furthermore, the capacitance values of the first input capacitive element 220 and the fifth input capacitive element 240 are substantially equal, and the capacitance values of the second input capacitive element 230 and the sixth input capacitive element 250 are substantially equal. The equivalent configuration of the input terminals of the first comparator 60 may improve the matching of the parasitic capacitances, allowing reducing or minimizing image degradation due to fluctuations in power supply voltage.

Figure 4:
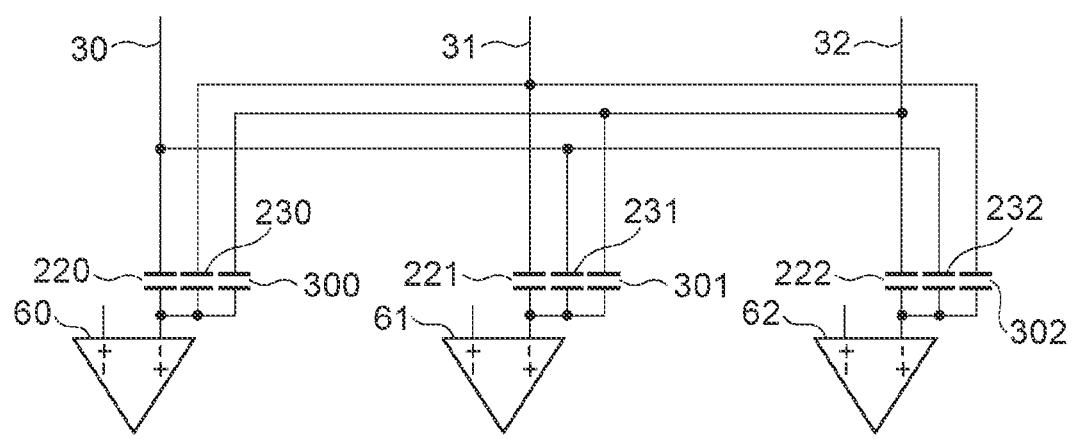
FIG. 4 is a circuit diagram illustrating a photoelectric conversion apparatus according to a modification of the first embodiment.

The number of times of addition of the pixel signals between columns is not limited to two. FIG. 4 illustrates a configuration example of addition of pixel signals in three columns. The first comparator 60 further includes a ninth input capacitive element 300, and the second comparator 61 further includes a 10th input capacitive element 301. A third comparator 62 includes an 11th input capacitive element 222, a 12th input capacitive element 232, and a 13th input capacitive element 302.

The first output line 30 is electrically connectable to the fourth input capacitive element 231 and the 12th input capacitive element 232. The second output line 31 is electrically connectable to the second input capacitive element 230 and the 13th input capacitive element 302. The third output line 32 is electrically connectable to the ninth input capacitive element 300 and the 10th input capacitive element 301. The above configuration allows reading pixel signals using three comparators at the addition of pixel signals in three columns.

Second Embodiment

A photoelectric conversion apparatus according to a second embodiment of the disclosure will be described with reference to FIGS. 5 and 6. The components same as the components of the first embodiment are given the same reference signs, and descriptions of these components may be omitted or simplified.

This embodiment differs from the first embodiment in that two ramp-signal generation circuits are provided. FIG. 5 illustrates an example of the circuit diagram of the photoelectric conversion apparatus according to this embodiment.

Figure 5:
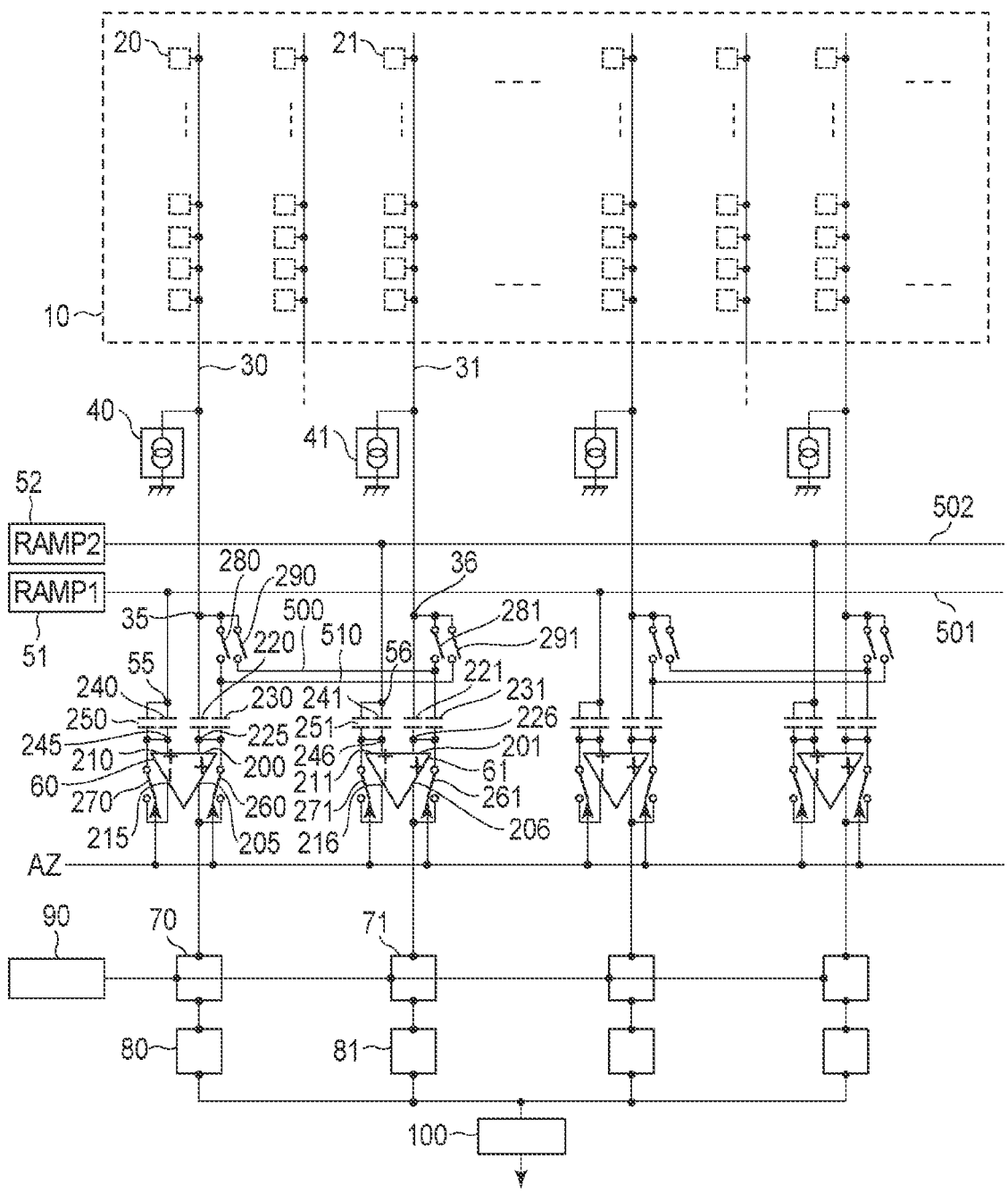
FIG. 5 is a circuit diagram illustrating a photoelectric conversion apparatus according to a second embodiment.

As illustrated in FIG. 5, the photoelectric conversion apparatus includes a first ramp-signal generation circuit 51 and a second ramp-signal generation circuit 52. The first ramp-signal generation circuit 51 is electrically connected to the first comparator 60 via a second ramp signal wiring line 501. The second ramp-signal generation circuit 52 is electrically connected to the second comparator 61 via a third ramp signal wiring line 502. A first ramp signal RAMP1 is input to the second input terminal 210 from the first ramp-signal generation circuit 51 via at least one of the fifth input capacitive element 240 and the sixth input capacitive element 250. A second ramp signal RAMP2 is input to the fourth input terminal 211 from the second ramp-signal generation circuit 52 via at least one of the seventh input capacitive element 241 and the eighth input capacitive element 251.

Figure 6:
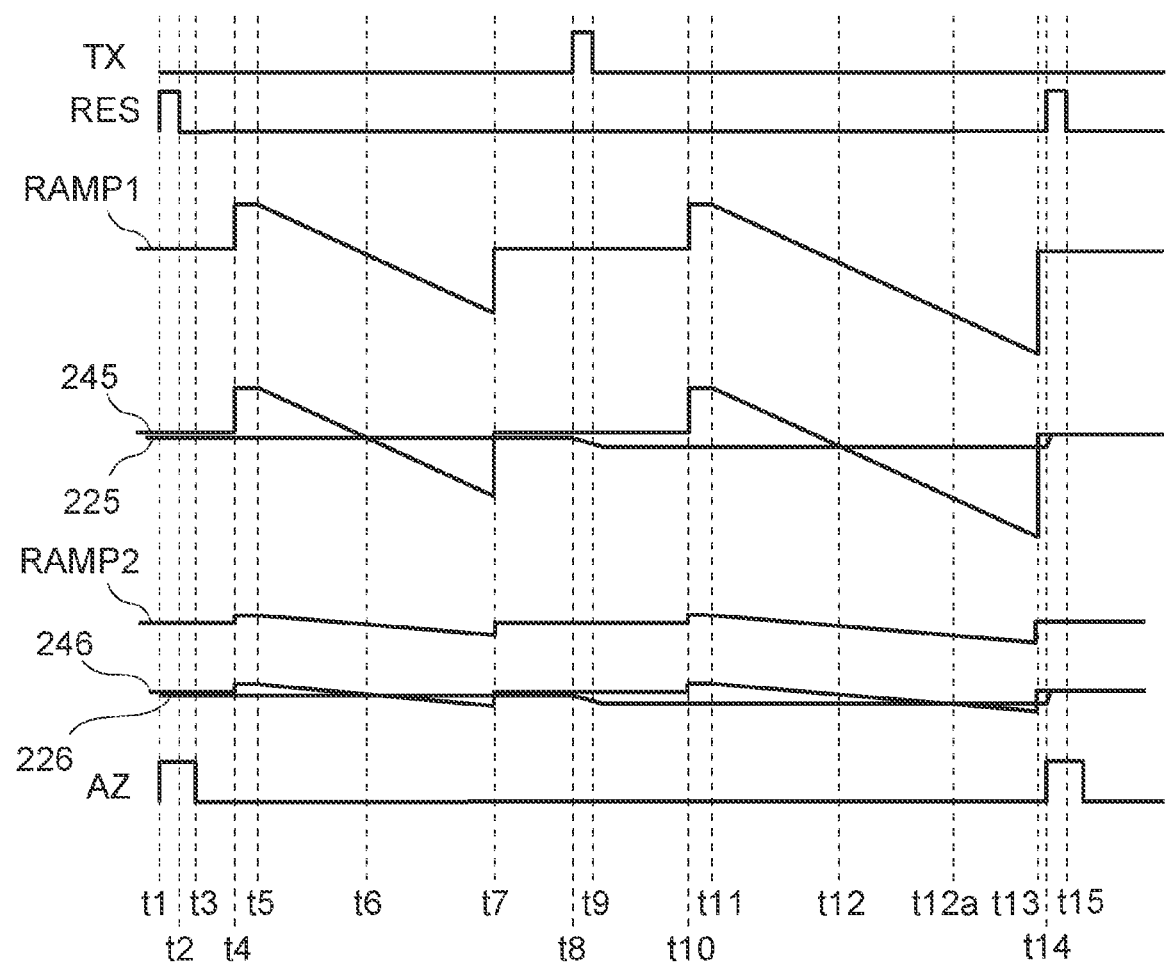
FIG. 6 is a timing chart showing the driving of the photoelectric conversion apparatus according to the second embodiment.

FIG. 6 is an example timing chart showing the driving of the photoelectric conversion apparatus according to this embodiment.

FIG. 6 shows time on the horizontal axis and voltage on the vertical axis. The control signals shown in FIG. 6 individually correspond to the control signals shown in FIGS. 2 and 3. The reset-level signal of the first pixel 20 is converted from analog to digital during the period from time t5 to time t7. The photoelectric conversion signal of the first pixel 20 is converted from analog to digital during the period from time t11 to time t13.

Referring to FIG. 6, driving at A/D conversion in performing addition of pixel signals between output lines in different columns will be described. In this embodiment, driving different from the driving of the first embodiment is performed because the inclinations of the first ramp signal RAMP1 and the second ramp signal RAMP2 are different. Specifically, the second ramp signal RAMP2, which has a smaller inclination than the first ramp signal RAMP1 that the first ramp-signal generation circuit 51 supplies to the first comparator 60, is supplied from the second ramp-signal generation circuit 52 to the second comparator 61. Thus, the magnitude relationship between the voltages of the sixth connection node 226 and the eighth connection node 246 changes at t12a. Here, the time t12a is later than time t12 at which the magnitude relationship between the voltages of the second connection node 225 and the fourth connection node 245 changes. Accordingly, the A/D conversion result obtained by the second comparator 61 takes a larger code value. In other words, the second comparator 61 can perform A/D conversion with an A/D conversion gain larger than that of the first comparator 60. Using a ramp signal with a small inclination to perform A/D conversion with a large gain results in a decrease in the signal amplitude of the output line capable of A/D conversion and a decrease in voltage per least significant bit (LSB), allowing higher accuracy A/D conversion. Accordingly, if the amplitude of the combined pixel signal of the first output line 30 and the second output line 31 is small, the high accuracy A/D conversion result of the second comparator 61 is used. In contrast, if the amplitude of the combined pixel signal of the first output line 30 and the second output line 31 is large, the A/D conversion result of the first comparator 60 is used. Thus, switching the driving depending on the magnitude of the amplitude of the combined pixel signal of the first output line 30 and the second output line 31 allows increasing the dynamic range.

Thus, this embodiment is configured to connect the first output line 30 to the fourth input capacitive element 231, and the second output line 31 to the second input capacitive element 230. This configuration allows, at the addition of the pixel signals between columns, reading using a single comparator and reading using a plurality of comparators. In other words, this configuration provides a variety of ways of reading at the addition of the pixel signals between columns.

Furthermore, this embodiment can perform A/D conversion with two different gains in adding pixel signals between columns because of the presence of the two ramp-signal generation circuits, which allows increasing the dynamic range.

Third Embodiment

A photoelectric conversion apparatus according to a third embodiment of the disclosure will be described with reference to FIGS. 7 to 10. The components same as the components of the first and second embodiments are given the same reference signs, and descriptions of these components may be omitted or simplified.

Figure 7:
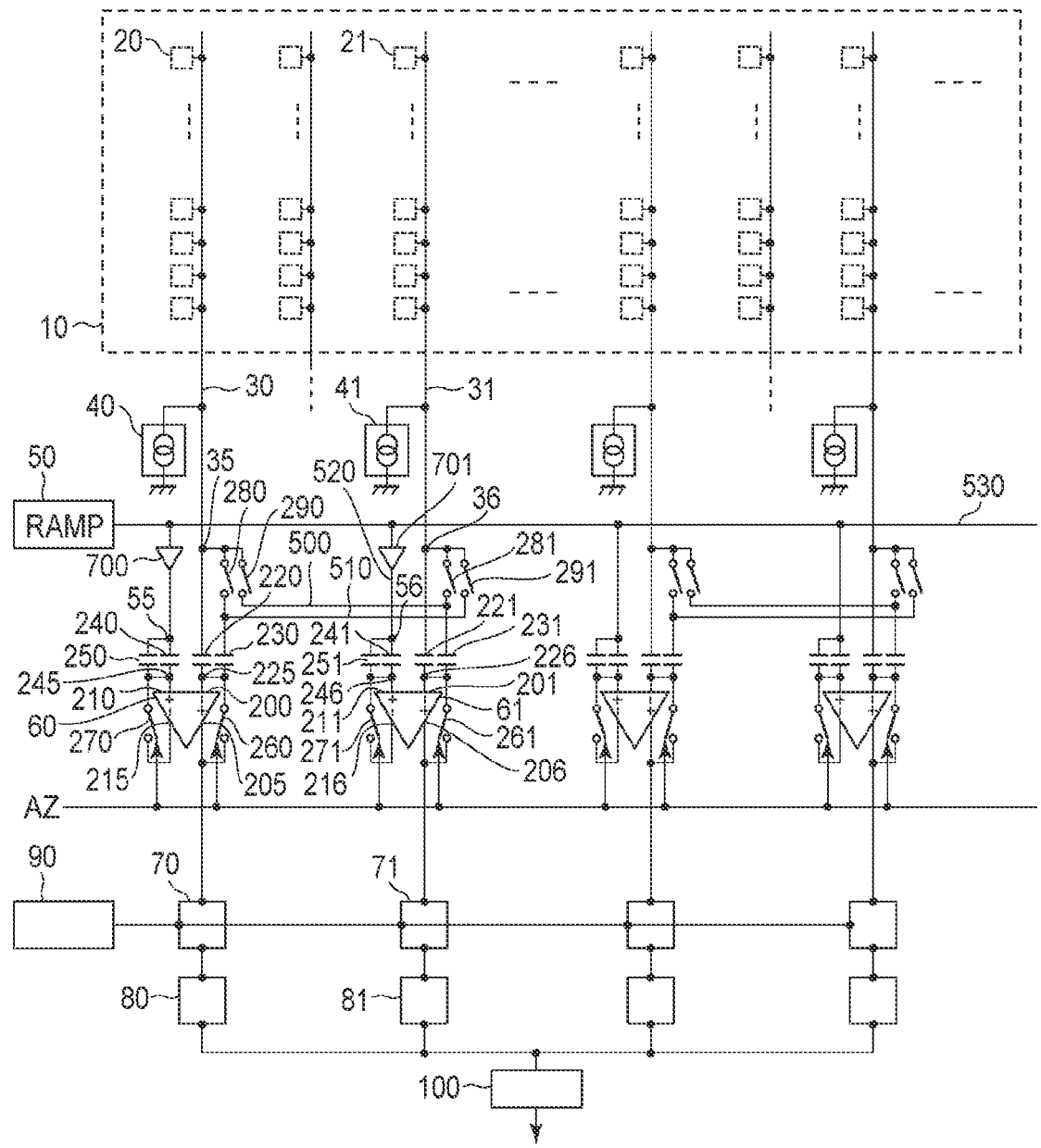
FIG. 7 is a circuit diagram illustrating a photoelectric conversion apparatus according to a third embodiment.

This embodiment differs from the first embodiment in that the comparators include buffers. FIG. 7 is an example circuit diagram of the photoelectric conversion apparatus according to this embodiment.

Figure 8:
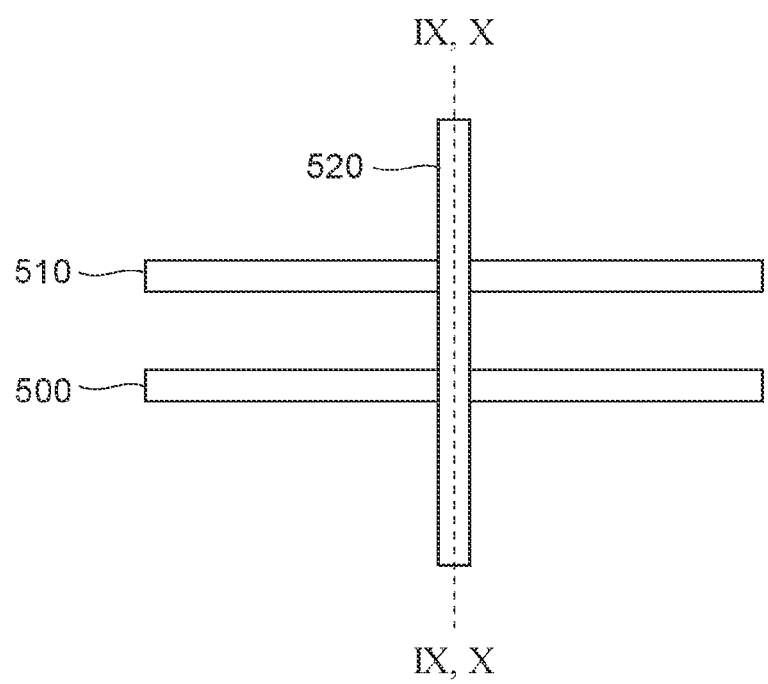
FIG. 8 is a plan view of the photoelectric conversion apparatus according to the third embodiment.
Figure 9:
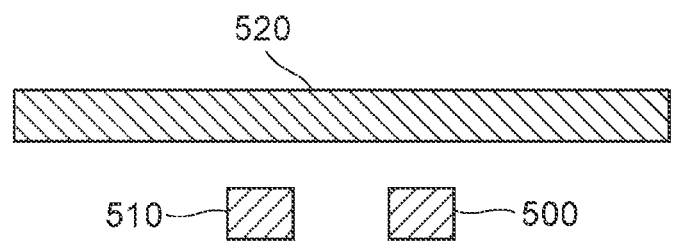
FIG. 9 is a cross-sectional view of the photoelectric conversion apparatus according to the third embodiment.
Figure 10:
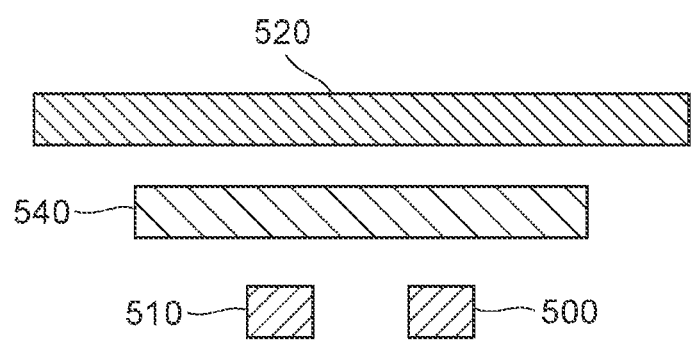
FIG. 10 is a cross-sectional view of the photoelectric conversion apparatus according to the third embodiment.

As shown in FIG. 7, the first comparator 60 includes a first buffer 700, and the second comparator 61 includes a second buffer 701. The first buffer 700 is disposed between the first ramp signal wiring line 530 and the first comparator 60. The second buffer 701 is disposed between the first ramp signal wiring line 530 and the second comparator 61. In other words, the fifth input capacitive element 240 is electrically connected between the first buffer 700 and the second input terminal 210, and the seventh input capacitive element 241 is electrically connected between the second buffer 701 and the fourth input terminal 211. A third wiring line 520 disposed between the second buffer 701 and the seventh input capacitive element 241 intersect the first wiring line 500 and the second wiring line 510. FIGS. 8 to 10 are layouts focusing on the intersections.

FIG. 8 is an example plan view of the photoelectric conversion apparatus according to this embodiment.

As illustrated in FIG. 8, the third wiring line 520 is disposed at a position overlapping with at least part of the first wiring line 500 in plan view with respect to the principal surfaces of the first pixels 20. The third wiring line 520 is disposed at a position overlapping with at least part of the second wiring line 510 in plan view with respect to the principal surfaces of the first pixels 20.

FIG. 9 is an example cross-sectional view of the photoelectric conversion apparatus according to this embodiment. FIG. 9 is an example cross-sectional view taken along dashed line IX-IX in FIG. 8.

In FIG. 9, parasitic capacitances are generated between the first wiring line 500 and the third wiring line 520 and between the second wiring line 510 and the third wiring line 520. This may cause interference between the columns by the pixel signals of the first output line 30 and the second output line 31 exerting an influence on the ramp signal of the first ramp signal wiring line 530 via the parasitic capacitances. This embodiment may eliminate or reduces the influence on the ramp signal of the first ramp signal wiring line 530 with the second buffer 701, thereby reducing the interference between the columns.

FIG. 10 is an example cross-sectional view of the photoelectric conversion apparatus according to this embodiment. FIG. 10 is an example cross-sectional view taken along dashed line X-X in FIG. 8.

As illustrated in FIG. 10, a shield wiring line 540 may be provided between the third wiring line 520 and the first wiring line 500 and between the third wiring line 520 and the second wiring line 510 in cross-sectional view with respect to the principal surfaces of the first pixels 20. The shield wiring line 540 is disposed at a position where the third wiring line 520 overlaps with at least part of the first wiring line 500 and the second wiring line 510 in plan view with respect to the principal surfaces of the first pixels 20. The presence of the shield wiring line 540 allows eliminating or reducing the influence on the ramp signal of the first ramp signal wiring line 530, thereby further reducing the interference between the columns.

Thus, this embodiment is configured to connect the first output line 30 to the fourth input capacitive element 231, and the second output line 31 to the second input capacitive element 230. This configuration allows, at the addition of the pixel signals between columns, reading using a single comparator and reading using a plurality of comparators. In other words, this configuration provides a variety of ways of reading at the addition of the pixel signals between columns.

Furthermore, this embodiment can reduce the interference between columns because the comparators include buffers.

Fourth Embodiment

A photoelectric conversion apparatus according to a fourth embodiment of the disclosure will be described with reference to FIG. 11. The components same as the components of the first to third embodiments are given the same reference signs, and descriptions of these components may be omitted or simplified.

This embodiment differs from the first embodiment in that the comparators include buffers and that the photoelectric conversion apparatus has a laminate structure. In this embodiment, the comparators do not have to include buffers. FIG. 11 is an example circuit diagram of the photoelectric conversion apparatus according to this embodiment.

Figure 11:
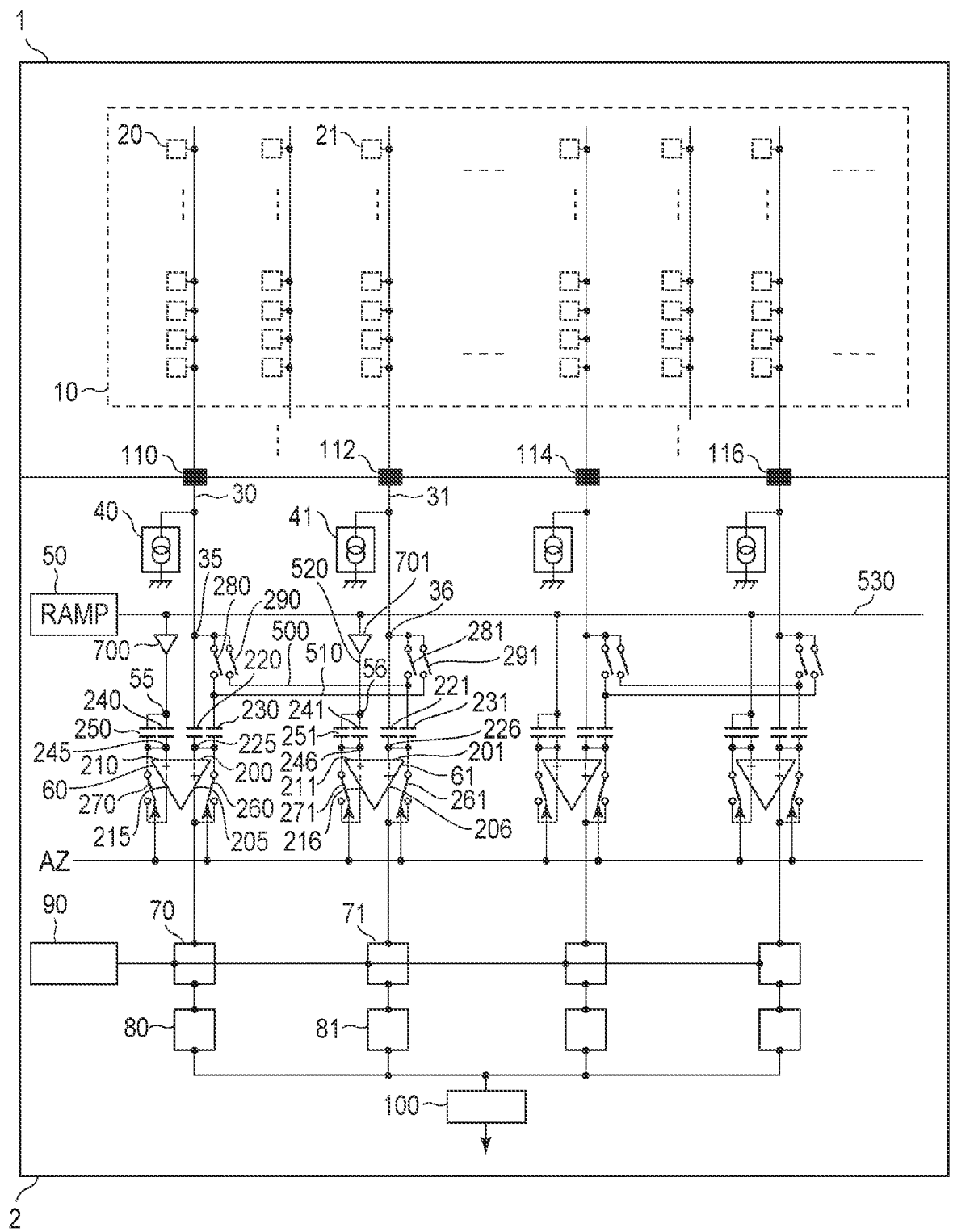
FIG. 11 is a circuit diagram illustrating a photoelectric conversion apparatus according to a fourth embodiment.

As illustrated in FIG. 11, the photoelectric conversion apparatus includes a first substrate 1, a second substrate 2, a first joint 110, a second joint 112, a third joint 114, and a fourth joint 116. The first pixels 20 and the second pixels 21 are disposed on the first substrate 1. The first current source 40, the second current source 41, the ramp-signal generation circuit 50, the first comparator 60, and the second comparator 61 are disposed on the second substrate 2. The first memory 70, the second memory 80, the third memory 71, the fourth memory 81, the counter 90, and the processing circuit 100 are disposed on the second substrate 2.

The first joint 110 is electrically connected to the first output line 30. In performing addition of pixel signals between columns, the first joint 110 is also electrically connected to the first wiring line 500 by turning on the third switch 290. The second joint 112 is electrically connected to the second output line 31. In performing addition of pixel signals between columns, the second joint 112 is also electrically connected to the second wiring line 510 by turning on the fourth switch 291. This allows, in performing addition of pixel signals between columns, the pixel signals of the first pixels 20 to be input to the first input capacitive element 220 via the first joint 110, and the pixel signals of the second pixels 21 to be input to the second input capacitive element 230 via the second joint 112. In performing addition of pixel signals between columns, the pixel signals of the second pixels 21 are input to the third input capacitive element 221 via the second joint 112, and the pixel signals of the first pixels 20 are input to the fourth input capacitive element 231 via the first joint 110. The third switch 290 is electrically connected between the first joint 110 and the fourth input capacitive element 231, and the fourth switch 291 is electrically connected between the second joint 112 and the second input capacitive element 230.

Thus, this embodiment is configured to connect the first output line 30 to the fourth input capacitive element 231, and the second output line 31 to the second input capacitive element 230. This configuration allows, at the addition of the pixel signals between columns, reading using a single comparator and reading using a plurality of comparators. In other words, this configuration provides a variety of ways of reading at the addition of the pixel signals between columns.

Furthermore, this embodiment has a laminate structure in which the pixels and the processing circuit are provided on different substrates, and the two substrates are electrically connected using substrate-to-substrate bonding to form one photoelectric conversion apparatus. This structure allows optimizing the process of fabricating the first substrate 1 provided with pixels to suit the pixels and optimizing the process of fabricating the second substrate 2 provided with a processing circuit to suit the processing circuit.

The laminated photoelectric conversion apparatus is not limited to be of the two-layer configuration but may be of three-layer configuration.

Fifth Embodiment

A photoelectric conversion apparatus according to a fifth embodiment of the disclosure will be described with reference to FIG. 12. The components same as the components of the first to fourth embodiments are given the same reference signs, and descriptions of these components may be omitted or simplified.

This embodiment differs from the first embodiment in that the comparators include buffers, that the photoelectric conversion apparatus has a laminate structure, and that the capacitance values of the input capacitive elements differ. In this embodiment, the comparators do not have to include buffers, and the photoelectric conversion apparatus need not have the laminate structure. FIG. 12 is an example circuit diagram of the photoelectric conversion apparatus according to this embodiment.

Figure 12:
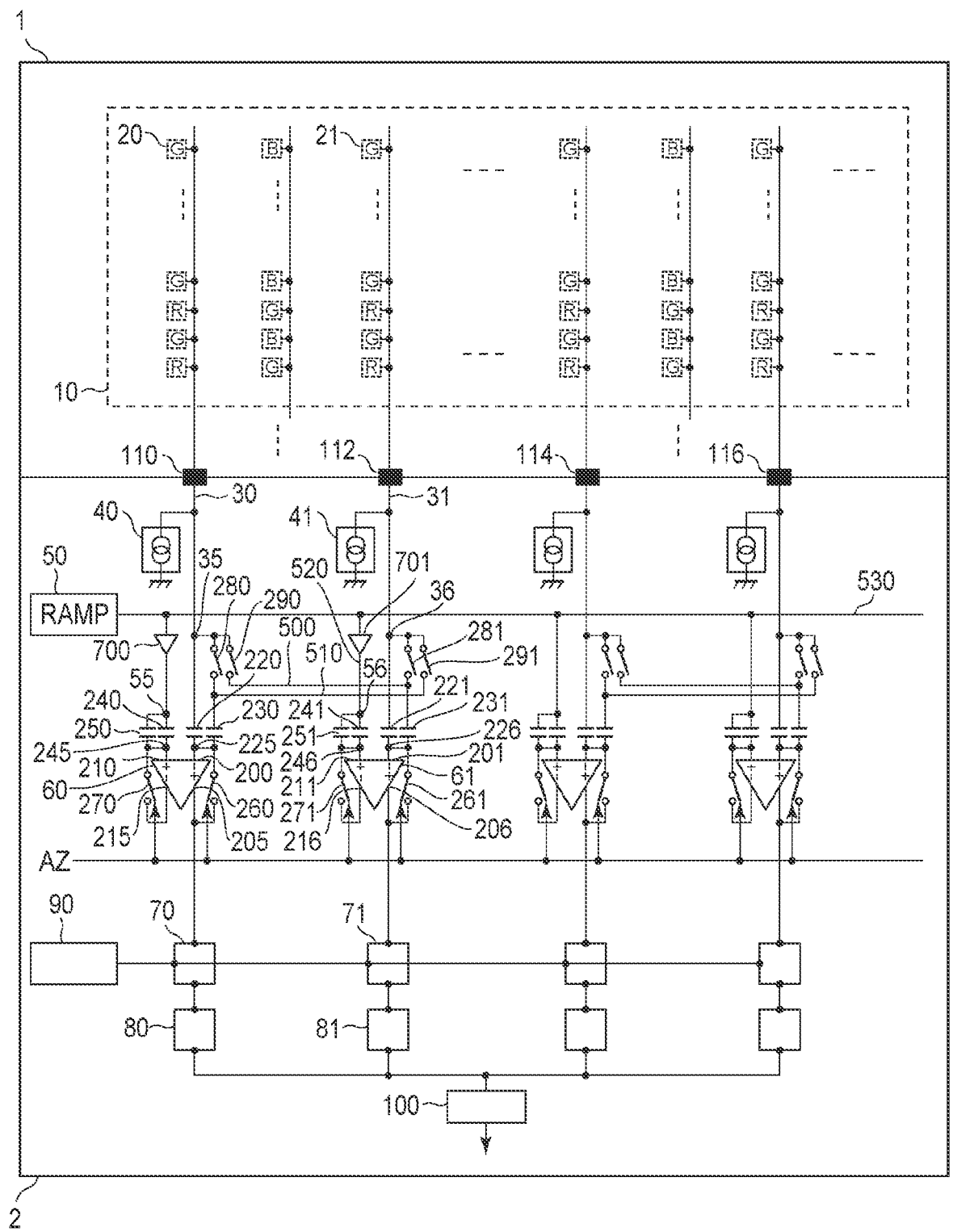
FIG. 12 is a circuit diagram illustrating a photoelectric conversion apparatus according to a fifth embodiment.

As illustrated in FIG. 12, the pixel array section 10 has a Bayer array of red pixels 11, green pixels 12, and blue pixels 13. The first comparator 60 is supplied with a control signal PWR1, and the second comparator 61 is supplied with a control signal PWR2. In one example, the ratio of the capacitance value of the first input capacitive element 220 and the second input capacitive element 230 to the capacitance value of the third input capacitive element 221 and the fourth input capacitive element 231 is 3:1. For this reason, for example, in reading the pixel signals of the row of the red pixels 11, the signals of the first output line 30 and the second output line 31 are added up at the ratio of 3:1. In reading the signals of the row of the green pixels 12, the signals of the first output line 30 and the second output line 31 are added up at the ratio of 1:3. Thus, the addition ratio can be changed depending on the color.

In performing addition of pixel signals between columns, the first switch 280 and the second switch 281 are turned off, and the third switch 290 and the fourth switch 291 are turned on (second mode). In other words, the second input capacitive element 230 is electrically connected to the second output line 31, and the fourth input capacitive element 231 is electrically connected to the first output line 30. Accordingly, the pixel signals output from the first pixels 20 are input to the first input terminal 200 via the first input capacitive element 220. The pixel signals output from the second pixels 21 are input to the first input terminal 200 via the second input capacitive element 230. The pixel signals output from the second pixels 21 are input to the third input terminal 201 via the third input capacitive element 221. The pixel signals output from the first pixels 20 are input to the third input terminal 201 via the fourth input capacitive element 231.

This allows the first comparator 60 to read the pixel signals obtained by adding up the pixel signals of the first output line 30 and the second output line 31 at the ratio of 3:1. In contrast, the second comparator 61 is allowed to read the pixel signals obtained by adding up the pixel signals of the first output line 30 and the second output line 31 at the ratio of 1:3. In reading the signals of the row of the red pixels 11, the first comparator 60 is allowed to read the pixel signals obtained by adding up the pixel signals of the first output line 30 and the second output line 31 at the ratio of 3:1. At that time, the second comparator 61 is turned off by the control signal PWR2, which allows power saving. In reading the signals of the row of the green pixels 12, the pixel signals obtained by adding up the pixel signals of the first output line 30 and the second output line 31 at the ratio of 1:3 can be read from the second comparator 61. At that time, the first comparator 60 is turned off in response to the control signal PWR1, which allows power saving.

Thus, this embodiment is configured to connect the first output line 30 to the fourth input capacitive element 231 and the second output line 31 to the second input capacitive element 230. This configuration allows, at the addition of the pixel signals between columns, reading using a single comparator and reading using a plurality of comparators. In other words, this configuration provides a variety of ways of reading at the addition of the pixel signals between columns.

Furthermore, this embodiment is configured to change the addition ratio depending on the pixel color because of the difference in capacitance value between the input capacitive elements. In the above embodiment, the addition ratio is changed depending on the pixel row. This is however illustrative only. For example, the addition ratio may be changed between the odd number columns and the even number columns. In one example, the pixel signals of the first output line 30 and the second output line 31 may be always read from the first comparator 60 at an addition ratio of 3:1. In this case, the second comparator 61 may be constantly in the power-off state during the reading.

Figure 13:
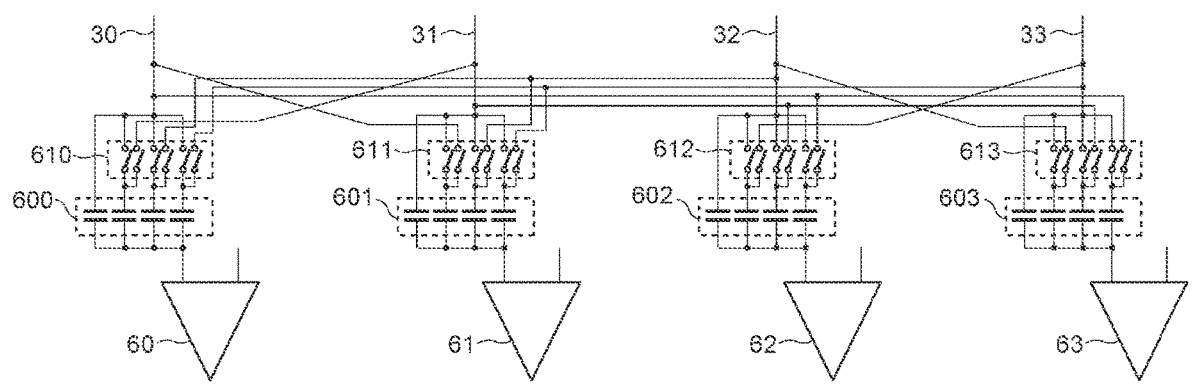
FIG. 13 is a circuit diagram illustrating a photoelectric conversion apparatus according to an embodiment.
Figure 14:
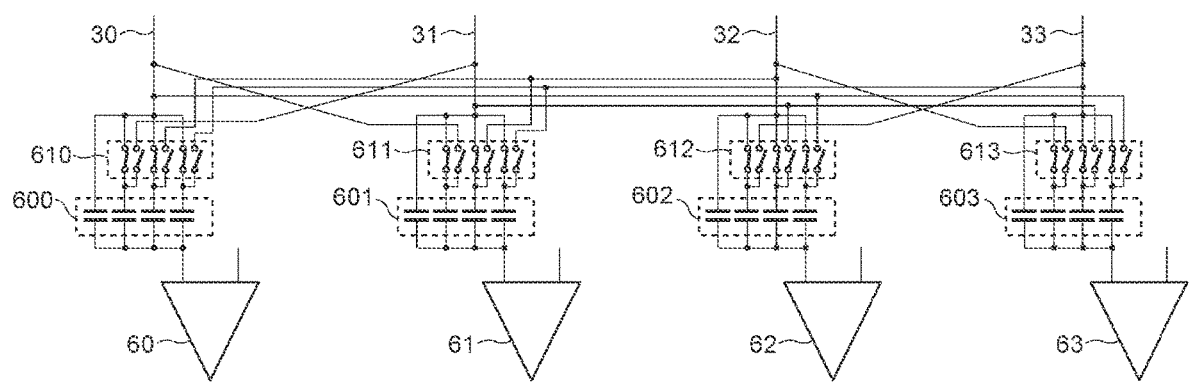
FIG. 14 is a circuit diagram illustrating a photoelectric conversion apparatus according to an embodiment.
Figure 15:
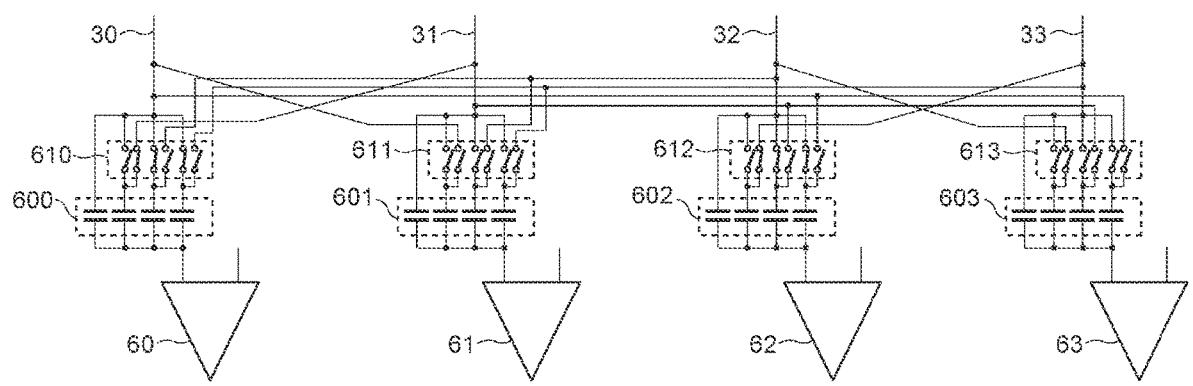
FIG. 15 is a circuit diagram illustrating a photoelectric conversion apparatus according to an embodiment.

The configuration of the photoelectric conversion apparatus is not limited to the above configuration. An alternative example is a circuit configuration in which addition of pixel signals between multiple patterns of columns can be performed. FIGS. 13 to 15 illustrate example circuit diagrams of the photoelectric conversion apparatus according to this embodiment.

Figure 16:
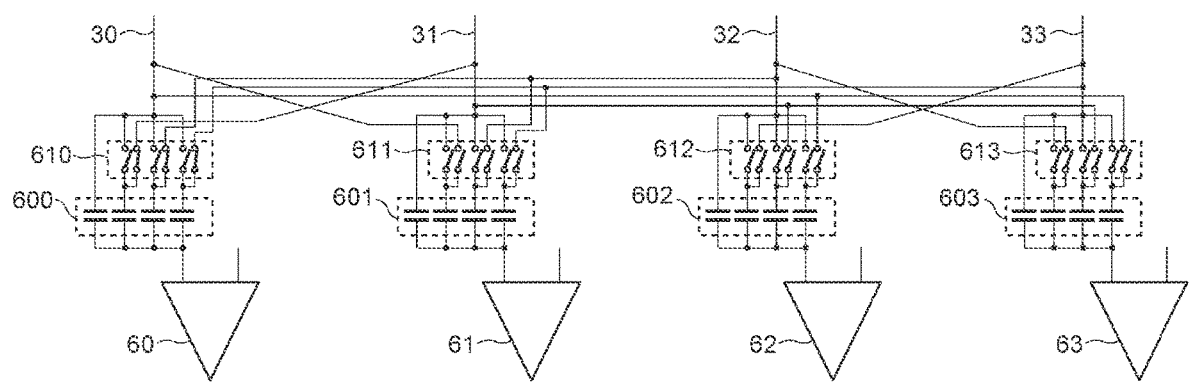
FIG. 16 is a circuit diagram illustrating a photoelectric conversion apparatus according to an embodiment.

As shown in FIG. 13, the first comparator 60, the second comparator 61, the third comparator 62, and a fourth comparator 63 respectively include a first input capacitive element group 600, a second input capacitive element group 601, a third input capacitive element group 602, and a fourth input capacitive element group 603. The first comparator 60, the second comparator 61, the third comparator 62, and the fourth comparator 63 respectively include a first switch group 610, a second switch group 611, a third switch group 612, and a fourth switch group 613. FIG. 14, FIG. 15, and FIG. 16 respectively illustrate the driving states in the case where addition of pixel signals between columns is not performed, in the case where addition of pixel signals between two columns is performed, and in the case where addition of pixel signals among four columns is performed.

As shown in FIG. 14, the first output line 30 is electrically connected to all the input capacitive elements in the first input capacitive element group 600. The second output line 31 is electrically connected to all the input capacitive elements in the second input capacitive element group 601. The third output line 32 is electrically connected to all the input capacitive elements in the third input capacitive element group 602. The fourth output line 33 is electrically connected to all the input capacitive elements in the fourth input capacitive element group 603.

As illustrated in FIG. 15, three of the input capacitive elements in the first input capacitive element group 600 are electrically connected to the first output line 30, and the other one is electrically connected to the second output line 31. This configuration allows adding up pixel signals at a ratio of 3:1. Three of the input capacitive elements in the third input capacitive element group 602 are electrically connected to the third output line 32, and the other one is electrically connected to the fourth output line 33. This configuration also allows adding up pixel signals at a ratio of 3:1.

At that time, the second comparator 61 and the fourth comparator 63 may be set to the power-off state.

As illustrated in FIG. 16, the input capacitive elements in the first input capacitive element group 600 are respectively electrically connected to the first output line 30, the second output line 31, the third output line 32, and the fourth output line 33.

This configuration allows adding up pixel signals among the four columns at a ratio of 1:1:1:1. At that time, the second comparator 61, the third comparator 62, and the fourth comparator 63 may be set to the power-off state.

Sixth Embodiment

Figure 17A:
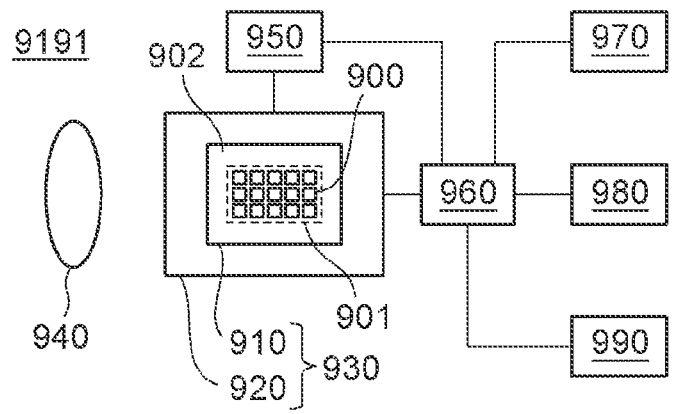
FIGS. 17A to 17C are schematic diagrams illustrating equipment according to a sixth embodiment.

A sixth embodiment is applicable to any of the first to fifth embodiments. FIG. 17A is a schematic diagram illustrating equipment 9191 including a semiconductor apparatus 930 of this embodiment. The semiconductor apparatus 930 may include the photoelectric conversion apparatus of each embodiment. The equipment 9191 including the semiconductor apparatus 930 will be described in detail. The semiconductor apparatus 930 may include a semiconductor device 910. The semiconductor apparatus 930 can include, in addition to the semiconductor device 910, a package 920 for housing the semiconductor device 910. The package 920 can include a substrate to which the semiconductor device 910 is fixed and a cover, such as glass, facing the semiconductor device 910. The package 920 can further include a bonding member, such as a bonding wire or bump, that bonds a terminal provided at the substrate and a terminal provided at the semiconductor device 910 together.

The equipment 9191 may include at least one of an optical device 940, a controller 950, a processor 960, a display 970, a storage 980, and a mechanical device 990. The optical device 940 is provided for the semiconductor apparatus 930. Examples of the optical device 940 include a lens, a shutter, and a mirror and include an optical system that guides light to the semiconductor apparatus 930. The controller 950 controls the semiconductor apparatus 930. One example of the controller 950 is a photoelectric conversion apparatus, such as an application specific integrated circuit (ASIC).

The processor 960 processes signals output from the semiconductor apparatus 930. The processor 960 is a photoelectric conversion apparatus, such as a central processing unit (CPU) or an ASIC, constituting an analog front end (AFE) or a digital front end (DFE). Examples of the display 970 include an electroluminescence (EL) display and a liquid crystal display that display information (images) obtained by the semiconductor apparatus 930. Examples of the storage 980 include a magnetic device and a semiconductor device that store information (images) obtained by the semiconductor apparatus 930. Examples of the storage 980 include volatile memories, such as a static random access memory (SRAM) and a dynamic random access memory (DRAM), and nonvolatile memories, such as a flash memory and a hard disk drive.

The mechanical device 990 includes a movable portion or a propulsive portion, such as a motor and an engine. The equipment 9191 displays signals output from the semiconductor apparatus 930 on the display 970 or transmits the signals to the outside with a communication device (not shown) of the equipment 9191. For this purpose, the equipment 9191 may further include the storage 980 and the processor 960, in addition to a memory circuit and an arithmetic circuit of the semiconductor apparatus 930. The mechanical device 990 may be controlled based on the signals output from the semiconductor apparatus 930.

The equipment 9191 is also suitable for electronic equipment, such as information terminals (for example, smartphones and wearable terminals) having a photographing function and cameras (for example, cameras with interchangeable lenses, compact cameras, video cameras, and monitoring cameras). The mechanical device 990 in cameras can drive the components of the optical device 940 for zooming, focusing, and shutter operations. Alternatively, the mechanical device 990 in cameras can move the semiconductor apparatus 930 for image stabilization.

Other examples of the equipment 9191 include transport equipment, such as vehicles, marine vessels, and flight vehicles (for example, drones and aircrafts). The mechanical device 990 in the transport equipment is used as a moving apparatus. The equipment 9191 serving as transport equipment is suitable for transporting the semiconductor apparatus 930 or assisting and/or automating the driving using a photographing function. The processor 960 for assisting and/or automating driving (controlling) can perform processing for operating the mechanical device 990 serving as a moving apparatus based on information obtained by the semiconductor apparatus 930. Other examples of the equipment 9191 include medical equipment, such as endoscopes, measurement equipment, such as range sensors, analytical equipment, such as electron microscopes, business equipment, such as copying machines, and industrial equipment, such as robots.

The above embodiments allow providing desired pixel characteristics. This therefore enhances the value of the photoelectric conversion apparatuses. Enhancing the value includes at least one of adding functions, improving the characteristics and the reliability, increasing the fabrication yield, and reducing the environment load, the cost, the size, and the weight.

Accordingly, using the semiconductor apparatus 930 according to this embodiment in the equipment 9191 may increase the value of the equipment. For example, mounting the semiconductor apparatus 930 in the transport equipment provides superior performance in photographing the outside of the transport equipment or measuring the external environment. Accordingly, mounting the photoelectric conversion apparatus according to this embodiment in transport equipment in manufacturing or selling the transport equipment is beneficial in enhancing the performance of the transport equipment itself. In particular, the semiconductor apparatus 930 is suitable for transport equipment that assists the driving and/or automated driving of the transport equipment using information obtained by the photoelectric conversion apparatus.

A photoelectric conversion system and a movable object in this embodiment will be described with reference to FIGS. 17B and 17C.

Figure 17B:
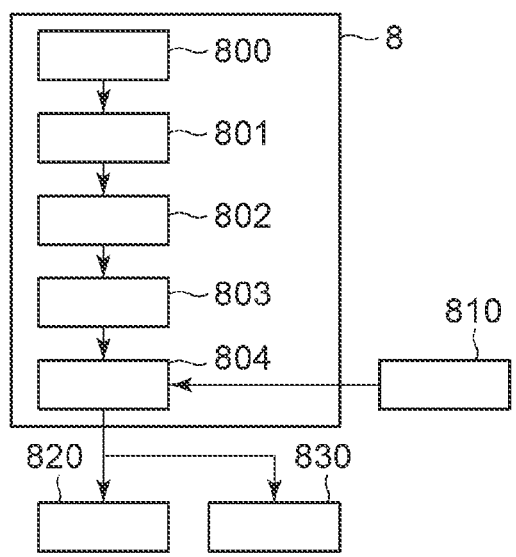

FIG. 17B illustrates an example of a photoelectric conversion system for car-mounted cameras. The photoelectric conversion system 8 includes a photoelectric conversion apparatus 800. The photoelectric conversion apparatus 800 is the photoelectric conversion apparatus (image capturing apparatus) according to one of the above embodiments. The photoelectric conversion system 8 includes an image processing unit 801 that performs image processing on a plurality of image data obtained by the photoelectric conversion apparatus 800 and a parallax acquisition unit 802 that calculates parallax (the phase difference between parallax images) from the plurality of image data obtained by the photoelectric conversion system 8. The photoelectric conversion system 8 may include an optical system (not shown), for example, a lens, a shutter, and a mirror, that guides light to the photoelectric conversion apparatus 80. The pixels of the photoelectric conversion apparatus 80 may include a plurality of photoelectric conversion units that is substantially conjugate to the pupil of the optical system. For example, the plurality of photoelectric conversion units that is substantially conjugate to the pupil is disposed in correspondence with one microlens. The plurality of photoelectric conversion units receives light that has passed through different positions of the pupil of the optical system, so that the photoelectric conversion apparatus 80 outputs image data corresponding to the light that has passed through the different positions. The parallax acquisition unit 802 may calculate the parallax using the output image data. The photoelectric conversion system 8 further includes a distance acquisition unit 803 that calculates the distance to the object based on the calculated parallax and a collision determination unit 804 that determines whether there is possibility of collision based on the calculated distance. The parallax acquisition unit 802 and the distance acquisition unit 803 are examples of a distance-information acquisition unit that obtains information on the distance to the object. In other words, the distance information is information about the parallax, the defocusing amount, the distance to the object, and the like. The collision determination unit 804 may determine whether collision can occur using any of the distance information. The distance information may be obtained by Time of Flight (ToF). The distance-information acquisition unit may be implemented by either specifically designed hardware or a software module. Alternatively, the distance-information acquisition unit may be implemented by a field programmable gate array (FPGA), an ASIC, or a combination thereof.

The photoelectric conversion system 8 is connected to a vehicle-information acquisition unit 810, thereby obtaining vehicle information such as vehicle speed, yaw rate, and steering angle. The photoelectric conversion system 8 is also connected to an electronic control unit (ECU) 820, which is a control unit that outputs a control signal for causing the vehicle to generate a braking force in response to the determination result of the collision determination unit 804. The photoelectric conversion system 8 is also connected to a warning device 830 that warns the driver in response to the determination result of the collision determination unit 804. For example, if there is a high collision possibility as a result of the determination of the collision determination unit 804, the ECU 820 performs vehicle control to avoid the collision or reduce damage by applying a brake, returning the accelerator, or decreasing the engine output. The warning device 830 warns the user, for example, gives a sound warning, displays warning information on the screen of a car navigation system or the like, or vibrates the seat belt or the steering.

In this embodiment, images in the area around the vehicle, for example, in front or rear, are captured by the photoelectric conversion system 8.

Figure 17C:
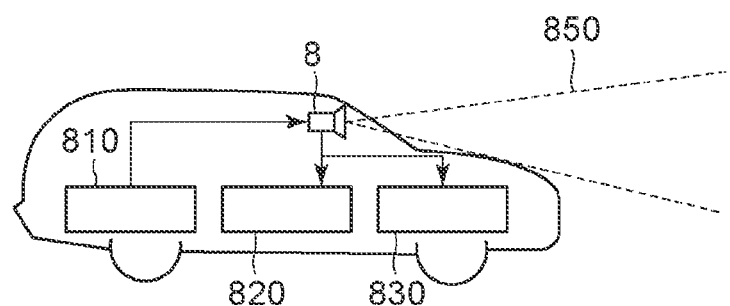

FIG. 17C illustrates the photoelectric conversion system 8 when capturing an image in front of the vehicle (an imaging area 850). The vehicle-information acquisition unit 810 issues instructions to the photoelectric conversion system 8, or the photoelectric conversion apparatus 800. This configuration increases the accuracy of ranging.

While the above example describes control for avoiding collision with another vehicle, the present disclosure is also applicable to control for autonomous driving following another vehicle and control for autonomous driving that prevents deviation from lanes. Furthermore, the photoelectric conversion system 8 is applicable not only to vehicles, such as automobiles, but also to movable objects (movable apparatus), such as marine vessels, aircrafts, and industrial robots. In addition, the photoelectric conversion system 8 is extensively applicable not only to movable objects but also to equipment that uses object recognition, such as an integrated transport system (ITS).

In this specification, the expressions, "A or B", "at least one of A and B", "at least one of A or/and B", and "one or more of A and/or B" can include all combinations of enumerated items unless otherwise explicitly defined. In other words, it is to be understood that the above expressions include all of a case where at least one A is included, a case where at least one B is included, and a case where both of at least one A and at least one B are included. This also applies to a combination of three or more components.

The above embodiments can be modified as appropriate without departing from the technical spirit and scope of the disclosure. The disclosure in this specification encompasses not only what is described in this specification but also all matters discernible from this specification and the drawings attached to this specification. The disclosure in this specification includes a complement set of concepts described in this specification. In other words, if there is a statement in this specification, for example, that "A is larger than B", this specification discloses that "A is not larger than B" even if the description "A is not larger than B" is omitted. This is because the description "A is larger than B" is based on the premise that the case of "A is not larger than B" is taken into account.

According to the embodiments of the disclosure, a photoelectric conversion apparatus including a plurality of comparators is capable of a variety of ways of readings using a plurality of comparators during addition of pixel signals.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-190920, filed Nov. 30, 2022, which is hereby incorporated by reference herein in its entirety.

What is claimed is:

1. A photoelectric conversion apparatus comprising:
   a first pixel;
   a second pixel;
   a first output line electrically connectable to the first pixel;
   a second output line electrically connectable to the second pixel;
   a first comparator electrically connectable to the first output line;
   a second comparator electrically connectable to the second output line;
   a first switch for the first output line; and
   a second switch for the second output line, wherein
   the first output line is electrically connectable to the second comparator via a first wiring line,
   the second output line is electrically connectable to the first comparator via a second wiring line,
   the first wiring line and the second wiring line are electrically isolated from each other,
   the first wiring line is provided with a third switch, and
   the second wiring line is provided with a fourth switch.

2. The photoelectric conversion apparatus according to claim 1, wherein
   the first comparator includes a first input terminal and a second input terminal,
   the second comparator includes a third input terminal and a fourth input terminal,
   a pixel signal output from at least one of the first pixel and the second pixel is input to the first input terminal,
   a first ramp signal is input to the second input terminal, the pixel signal output from at least one of the first pixel and the second pixel is input to the third input terminal, and a second ramp signal is input to the fourth input terminal.

3. The photoelectric conversion apparatus according to claim 2, wherein
the first comparator includes a first input capacitive element and a second input capacitive element,
the second comparator includes a third input capacitive element and a fourth input capacitive element,
the pixel signal output from the first pixel is input to the first input terminal via the first input capacitive element,
the pixel signal output from the second pixel is input to the first input terminal via the second input capacitive element,
the pixel signal output from the second pixel is input to the third input terminal via the third input capacitive element, and
the pixel signal output from the first pixel is input to the third input terminal via the fourth input capacitive element.

4. The photoelectric conversion apparatus according to claim 2, wherein an inclination of the first ramp signal and an inclination of the second ramp signal are substantially equal to each other at timing when the first comparator and the second comparator perform analog-to-digital conversion of the pixel signal output from the first pixel and the pixel signal output from the second pixel, respectively.

5. The photoelectric conversion apparatus according to claim 2, wherein
the first ramp signal is supplied from a first ramp-signal generation circuit,
the second ramp signal is supplied from a second ramp-signal generation circuit, and
an inclination of the first ramp signal and an inclination of the second ramp signal differ from each other at timing when the first comparator and the second comparator perform analog-to-digital conversion of the pixel signal output from the first pixel and the pixel signal output from the second pixel, respectively.

6. The photoelectric conversion apparatus according to claim 3, wherein
the first comparator includes a fifth input capacitive element and a sixth input capacitive element,
the second comparator includes a seventh input capacitive element and an eighth input capacitive element,
the first ramp signal is input to the second input terminal via at least one of the fifth input capacitive element and the sixth input capacitive element, and
the second ramp signal is input to the fourth input terminal via at least one of the seventh input capacitive element and the eighth input capacitive element.

7. The photoelectric conversion apparatus according to claim 2, wherein sum of the pixel signal output from the first pixel and the pixel signal output from the second pixel is input to the first input terminal.

8. The photoelectric conversion apparatus according to claim 3, wherein
a capacitance value of the first input capacitive element is greater than a capacitance value of the second input capacitive element, and
a capacitance value of the third input capacitive element is greater than a capacitance value of the fourth input capacitive element.

9. The photoelectric conversion apparatus according to claim 6, wherein sum of a capacitance value of the first input capacitive element and a capacitance value of the second input capacitive element is substantially equal to sum of a capacitance value of the fifth input capacitive element and a capacitance value of the sixth input capacitive element.

10. The photoelectric conversion apparatus according to claim 6, wherein
the first comparator includes a first buffer,
the fifth input capacitive element is electrically connected between the first buffer and the second input terminal,
the second comparator includes a second buffer, and
the seventh input capacitive element is electrically connected between the second buffer and the fourth input terminal.

11. The photoelectric conversion apparatus according to claim 3, wherein
the first switch is electrically connected between the first pixel and the second input capacitive element,
the second switch is electrically connected between the second pixel and the fourth input capacitive element,
the third switch is electrically connected between the first pixel and the fourth input capacitive element, and
the fourth switch is electrically connected between the second pixel and the second input capacitive element.

12. The photoelectric conversion apparatus according to claim 1, wherein the first switch and the second switch are in an on-state at timing when the third switch and the fourth switch are in an off-state.

13. The photoelectric conversion apparatus according to claim 1, wherein a first mode in which the third switch and the fourth switch are in an off-state at timing when the first switch and the second switch are in an on-state and a second mode in which the third switch and the fourth switch are in the on-state at timing when the first switch and the second switch are in the off-state are switched.

14. The photoelectric conversion apparatus according to claim 9, wherein
the capacitance value of the first input capacitive element is substantially equal to the capacitance value of the second input capacitive element, and
the capacitance value of the fifth input capacitive element is substantially equal to the capacitance value of the sixth input capacitive element.

15. The photoelectric conversion apparatus according to claim 10, wherein
a third wiring line is provided between the seventh input capacitive element and the second buffer,
in plan view with respect to the principal surface, the third wiring line is disposed at a position overlapping with at least part of the first wiring line in plan view with respect to a principal surface of the first pixel, and
in plan view with respect to the principal surface, the third wiring line is disposed at a position overlapping with at least part of the second wiring line.

16. The photoelectric conversion apparatus according to claim 15, wherein a shield wiring line is disposed between the third wiring line and the first wiring line and between the third wiring line and the second wiring line in cross-sectional view with respect to the principal surface, and
the shield wiring line is disposed at a position where the third wiring line overlaps with at least part of the first wiring line and the second wiring line in plan view with respect to the principal surface.

17. The photoelectric conversion apparatus according to claim 1, wherein
the first pixel and the second pixel are disposed on a first substrate, and the first comparator and the second comparator are disposed on a second substrate.

18. The photoelectric conversion apparatus according to claim 3, wherein
a first joint is electrically connected to the first output line, and a second joint is electrically connected to the second output line,
the third switch is electrically connected between the first joint and the fourth input capacitive element, and
the fourth switch is electrically connected between the second joint and the second input capacitive element.

19. The photoelectric conversion apparatus according to claim 1, wherein the second comparator is set to a power-off state.

20. A photoelectric conversion apparatus comprising:
a first pixel;
a second pixels;
a first output line electrically connectable to the first pixel;
a second output line electrically connectable to the second pixel;
a first comparator electrically connectable to the first output line; and
a second comparator electrically connectable to the second output line, wherein
the first output line is electrically connectable to the second comparator via a first wiring line,
the second output line is electrically connectable to the first comparator via a second wiring line,
the first wiring line and the second wiring line are electrically isolated from each other, and
sum of a pixel signal output from the first pixel and a pixel signal output from the second pixels is input to the first comparator.

21. Equipment comprising the photoelectric conversion apparatus according to claim 1, the equipment comprising at least any one of:
an optical device that guides light to the photoelectric conversion apparatus;
a controller that controls the photoelectric conversion apparatus;
a processor that processes a signal output from the photoelectric conversion apparatus;
a display that displays information obtained by the photoelectric conversion apparatus;
a storage that stores the information obtained by the photoelectric conversion apparatus; and
a mechanical device that operates based on the information obtained by the photoelectric conversion apparatus.

* * * * *